United States Patent [19]
Child

[11] 3,922,148
[45] Nov. 25, 1975

[54] PRODUCTION OF METHANE-RICH GAS
[75] Inventor: Edward T. Child, Tarrytown, N.Y.
[73] Assignee: Texaco Development Corporation, New York, N.Y.
[22] Filed: May 16, 1974
[21] Appl. No.: 470,701

[52] U.S. Cl. .................. 48/197 R; 48/206; 48/215; 252/373; 260/449 M
[51] Int. Cl.² ............................................ C10J 3/06
[58] Field of Search .................. 48/206, 215, 197 R; 260/449 M; 252/373

[56] References Cited
UNITED STATES PATENTS
3,511,624   5/1970   Humphries et al. ............. 260/449 M Primary Examiner—S. Leon Bashore
Assistant Examiner—George C. Yeung
Attorney, Agent, or Firm—T. H. Whaley; C. G. Ries; Albert Brent

[57] ABSTRACT

This is an improved continuous process for producing a clean methane-rich gas stream without the concomitant formation of particulate carbon which would ordinarily decrease the efficiency of the process and shorten the life of the catalyst. By-product superheated steam is simultaneously produced at a maximum temperature. The product stream may have a methane content up to 98 to 99 mole % or higher and a gross heating value up to 1000 BTU per SCF or more. Process steps include partial oxidation of a hydrocarbonaceous fuel under operating conditions that produce a synthesis gas containing 10 to 30 mole % methane (dry and $CO_2$-free basis) and a $H_2/CO$ mole ratio of 2.6 or higher, and reacting the methane-rich process gas stream in one to three catalytic methanation stages under critical operating conditions that increase the methane content in the process gas stream stepwise up to 98 mole % or higher without incipient soot formation for each corresponding $CH_4$ content of the feed as one proceeds from one methanation step to another. Heat from the highly exothermic methanation reaction is used to make valuable by-product superheated steam. The product gas may be burned without polluting the atmosphere.

10 Claims, 1 Drawing Figure

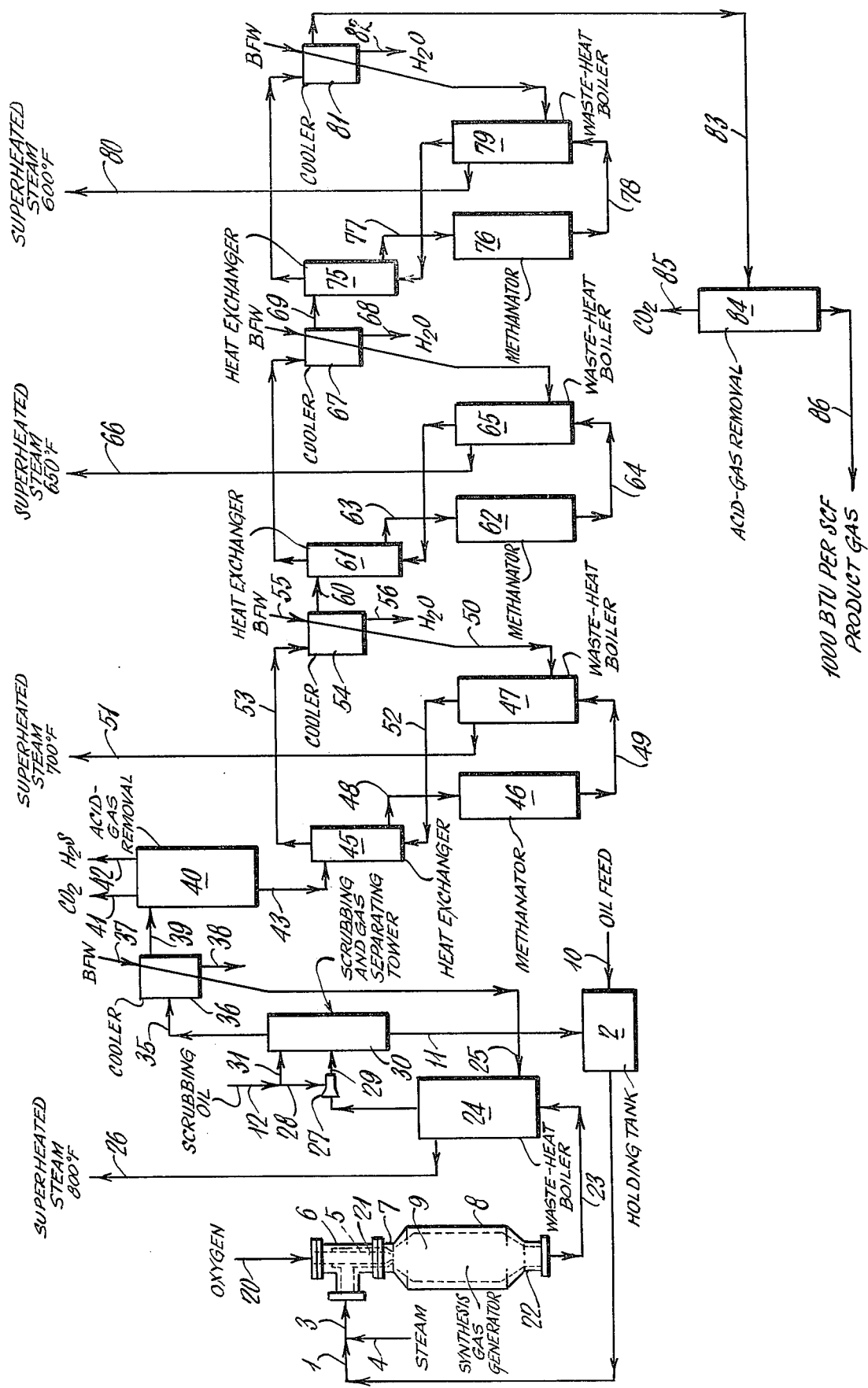

PRODUCTION OF METHANE-RICH GAS

BACKGROUND OF THE INVENTION

1. Field of the Invention:

This invention relates to a continuous process for the production of a clean methanerich gas stream from hydrocarbonaceous fuels. More specifically, the present invention relates to the production of gaseous heating fuels free from particulate carbon.

2. Describtion of the Prior Art:

Nation-wide fuel shortages have accelerated the search for new sources of energy. New sources of low-cost gaseous heating fuels which will not pollute the atmosphere when burned are particularly in demand.

In coassigned U.S. Pat. No. 3,688,438, synthesis gas was made having up to 26 volume percent of methane by the partial oxidation of a hydrocarbonaceous fuel using comparatively high steam to fuel weight ratios and no subsequent catalytic methanation step. In coassigned U.S. Pat. No. 3,709,669, the synthesis gas leaving the partial oxidation gas generator is subjected to an additional step involving the water-gas shift reaction to adjust the $H_2/CO$ mole ratio to preferably 3 before catalytic methanation.

The subject process avoids the problem of insipient soot formation which was found to occur when the methane content of the feed gas to a catalytic methanator is increased above 10 mole % (dry, $CO_2$-free basis).

SUMMARY

This is an improved process for producing a clean methane-rich gas stream having a gross heating value of over 600 to 1000 BTU per SCF (British Thermal Units per Standard Cubic Foot) from hydrocarbonaceous fuels. Hydrogen and carbon monoxide in a methane-rich process gas stream are reacted together in one to three catalytic methanation stages under critical operating conditions that increase the methane content in the process gas stream stepwise up to 99 mole % or higher without incipient soot formation for each corresponding $CH_4$ content of the feed as one proceeds from one methanation step to another. Heat from the highly exothermic methanation reaction is used to produce simultaneously by-product superheated steam at the maximum temperature.

Included in the process are the following steps: non-catalytic partial oxidation of the hydrocarbonaceous fuel with substantially pure oxygen and steam at a temperature in the range of about 1200° to 2200°F. and a pressure in the range of about 25 to 250 atmospheres to produce a gaseous mixture comprising principally $H_2$, CO, $CH_4$, $CO_2$, and $H_2O$, wherein the $H_2/CO$ mole ratio is above 2.6, and preferably in the range of 2.6 to 4 and the mole % $CH_4$ is in the range of about 10 to 30 (dry, $CO_2$-free basis); extracting the sensible heat in the process gas stream for example in a waste heat boiler to produce by-product superheated steam; cleaning, purifying, and preheating the process gas stream; and catalytic methanation of the methane-rich process gas stream under critical conditions that increase the methane content of the methane-rich gas stream to about 40 to 60 mole % $CH_4$ (dry basis) without the concomitant formation of particulate carbon (soot). The operating conditions in the methanator include temperature in the range of about 1420° to 1570°F., pressure in the range of about 25 to 250 atmospheres gauge, and $H_2/CO$ mole ratio of 2.6 or higher.

The sensible heat in the methane-rich gas is used to preheat the feed gas stream to the methanator and to make superheated steam in a wasteheat boiler.

The gross heating value of the methane-rich gas stream from the first methanation zone is above 600 to about 740 BTU per SCF (dry basis). This heating value may be increased for example to 1000 BTU per SCF without producing soot, by two additional catalytic methanation steps under critical operating conditions followed by removal of $H_2O$ and $CO_2$. Additional superheated steam is also obtained by cooling the process gas stream in a waste heat boiler. Thus, in a second catalytic methanation step under critical conditions the methane content of the methane-rich process gas stream may be increased further to about 65 to 85 mole % (dry basis) without the concomitant formation of soot. The operating conditions include reaction temperature in the range of about 1060° to 1210°F., pressure in the range of about 25 to 250 atmospheres gauge and a $H_2/CO$ mole ratio of 2.6 or above. Then in a third catalytic methanation step under critical conditions, the methane content of the methane-rich process gas stream may be increased further to about 90 to 98 mole % (dry basis) without the concomitant formation of soot. The operating conditions include reaction temperature in the range of about 700° to 850°F., pressure in the range of about 25 to 250 atmospheres gauge, and a $H_2/CO$ mole ratio of 2.6 or more. After final purification and acid gas removal a clean product gas is produced containing about 98 to 99 mole % $CH_4$ or more. Preferably, the pressure in all three methanators is the same as the pressure in the synthesis gas generator less any ordinary small pressure drops in the line. The product gas may be burned without polluting the atmosphere.

DESCRIPTION OF THE INVENTION

By means of the subject process, a clean methane-rich product gas stream containing methane in the range of about 40 to 99 mole % (dry basis) or more is produced from hydrocarbonaceous fuels, simultaneously with superheated steam. The product gas has a gross heating value in the range of over 600 BTU/SCF to 1000 BTU/SCF and higher depending on the number of catalytic methanation steps employed. By controlling the operating conditions and gas compositions in the critical ranges specified, it was unexpectedly found by the subject invention that insipient soot formation was eliminated in each catalytic methanation zone although the corresponding $CH_4$ content of the methane-rich feed gas increased from one methanation step to another, and simultaneously high temperatures were used to produce valuable by-products superheated steam. Further, the product gas is substantially free from particulate carbon and sulfur compounds and may be burned without polluting the atmosphere.

In the first step of the process, synthesis gas comprising principally hydrogen, carbon monoxide, carbon dioxide, water vapor, methane, and one or more members of group nitrogen, argon, carbonyl sulfide, and hydrogen sulfide, as well as entrained particulate carbon is produced by the reaction of a hydrocarbonaceous fuel by partial oxidation with substantially pure oxygen and steam in the reaction zone of a free-flow synthesis gas generator free from packing or catalyst. In the manner to be more fully described, the composition of the charge and the conditions of the reaction are controlled so as to produce an effluent gas stream containing a mole ratio $H_2/CO$ in the range of above 2.6 to 4.0, from about 10 to 30 mole % (dry, $CO_2$-free basis) $CH_4$, and from about 0.1 to 13 weight percent of entrained particulate carbon (basis weight of carbon in the hydrocarbonaceous fuel).

Hydrocarbonaceous fuels that are suitable feedstocks to the gas generator include by definition various petroleum distillate and residua, gas oil, residual fuel, reduced crude, whole crude, asphalt, coal tar, coal oil, shale oil, and tar sand oil. Light petroleum distillates having an initial atmospheric boiling point (i.b.p.-ASTM D86) up to 400°F., e.g. naphtha, gasoline, kerosine may be used. However, an economic advantage is obtained when low cost sulfur containing petroleum fuels having an I.B.P. in the range of 400° to 900°F. and with a sulfur content in the range of about 1 to 7 wt. % are used. Included also are pumpable slurries of solid hydrocarbonaceous fuels e.g. coal, coal char, particulate carbon, and petroleum coke in a liquid hydrocarbon fuel such as one previously listed, or in water.

$H_2O$ is used to moderate the temperature in the synthesis gas generator and may be supplied in liquid or gaseous phase. It may be introduced either separately or in admixture with the free-oxygen containing gas or with the hydrocarbonaceous feedstock, or both. About 3.0 to 5.0 lbs. of $H_2O$ are introduced into the reaction zone per lb. of hydrocarbonaceous fuel.

Substantially pure oxygen i.e. greater than 95 mole % oxygen (the remainder comprising $N_2$ and rare gases) may be introduced into the reaction zone as the gaseous oxidant at a temperature in the range of about ambient to 1200°F. The ratio of free-oxygen in the oxidant to carbon in the feedstock (O/C atom/atom) is in the range of about 0.60 to 1.2, and preferably about 0.8 to 1.0. The amount of oxygen supplied is controlable so as to prevent complete oxidation of the hydrocarbonaceous feed and to control the temperature in the reaction zone.

The free-oxygen containing gas is introduced into the reaction zone of the synthesis gas generator simultaneously with the $H_2O$ and hydrocarbonaceous fuel. Suitably, an annulus-type burner, such as described in coassigned U.S. Pat. No. 2,929,460 issued to duBois Eastman et.al., or in coassigned U.S. Pat. No. 3,733,606 issued to C. P. Marion et.al., may be employed.

The partial oxidation reaction takes place in the reaction zone of a conventional Texaco Synthesis Gas Generator. The synthesis gas generator is free from any obstruction to the flow of the gases therethrough. It is a cylindrically shaped, vertical steel pressure vessel whose inside walls are lined with refractory e.g. aluminum oxide. Suitable gas generators are disclosed in coassigned U.S. Pat. Nos. 2,818,326 and 3,000,711 issued to DuBois Eastman et.al. The size of the reaction chamber is selected so that the average residence time of the reactants and resulting reaction products within the reactor is within the range of 0.5 to 20 seconds, and preferably 1 to 8 seconds. Axially aligned flanged inlet and outlet ports may be located at the top and bottom of the gas generator. The various feedstreams may be introduced into the gas generator at ambient temperature but preferably at a temperature in the range of about 100°F. to 1000°F. Preferably, an annulus-type burner as previously described is axially mounted in the flanged inlet port at the top of the gas generator and is used for introducing and mixing the feedstreams.

In the reaction zone of the free-flow noncatalytic synthesis gas generator, reaction takes place at an autogenous temperature in the range of about 1200° to 2200°F. and preferably in the range of about 1200° to 1700°F., and at a pressure in the range of about 25 to 250 atmospheres, and preferably in the range of about 25 to 150 atmospheres.

The effluent gas stream from the gas generator has the following composition in mole % on a dry basis: $H_2$ 30 to 50; CO 8 to 18; $CO_2$ 30 to 40; $CH_4$ 6 to 20; $H_2S$ nil to 2.0; COS nil to 0.1; $N_2$ nil to 0.3; A nil to 0.3; and from 0.1 to 13 wt. % of particulate carbon (basis C in the hydrocarbonaceous fuel). Methane is present in the amount of 10 to 30 mole % (dry, $CO_2$ free basis). The mole ratio $H_2/CO$ is above about 2.6, and preferably in the range of about 2.6 to 4.0.

By conventional means, the effluent gas stream from the generator is cooled, and the particulate carbon and gaseous impurities are removed. For example, the effluent gas stream may be passed through an inline waste-heat boiler and cooled to a temperature in the range of about 300° to 800°F. by indirect heat exchange with water, thereby producing superheated steam for example at a temperature in the range of about 750° to 850°F. The steam may be used elsewhere in the process, such as in the gas generator. Excess steam may be exported.

Particulate carbon, also referred to as free-carbon and soot, and any other entrained solids may be removed from the effluent gas stream by well known scrubbing techniques in a gas-liquid scrubbing zone. For example, the particulate carbon may be removed by scrubbing the process gas with a scrubbing fluid comprising oil, water, or both. The slurry of particulate carbon and scrubbing fluid may be recycled to the gas generator as a portion of the hydrocarbonaceous feedstock.

When oil is used as the scrubbing fluid, preferably the temperature of the scrubbing oil is kept below its cracking temperature and above the dewpoint of $H_2O$ in the process gas stream. In one embodiment of the process, the process gas stream is introduced into a liquid-gas tray-type column, such as more fully described in Perry's Chemical Engineers' Handbook, Fourth Edition McGraw Hill 1963, Pages 18–3 to 5 in countercurrent flow with a liquid hydrocarbon fuel oil. A slurry of particulate carbon and liquid hydrocarbon fuel oil is removed from the bottom of the scrubbing column at a suitable preheat temperature for introducing into the reaction zone of the synthesis gas generator as a portion of the hydrcoarbonaceous feedstock.

When required, additional scrubbing may be provided to supplement the aforesaid gas scrubbing. For example, the gas stream may be quenched in hydrocarbon oil or washed with a liquid hydrocarbon fuel by means of a scrubbing nozzle or venturi scrubber, such as described in Perry's Chemical Engineers' Handbook Fourth Edition, McGraw Hill 1963, Pages 18–54 to 18–56. The process gas stream leaving the top of the scrubbing tower is substantially free from particulate carbon and is at a temperature in the range of about 300°–650°F. This stream is then cooled below the dew point to condense out and separate any volatilized hydrocarbons and water found therein. For additional information on suitable gas scrubbing, reference is made to coassigned U.S. Pat. No. 3,639,261.

In the next step in the subject process, acid gas comprising a gas selected from the group consisting of $CO_2$, $H_2S$, COS, and mixtures thereof is removed from the process gas stream in a gas purification zone. This may be done by suitable conventional processing involving physical or chemical absorption with solvents, such as methyl alcohol, n-methyl pyrrolidone, triethanolamine, propylene carbonate, and potassium carbonate. Methane, hydrogen and CO should be substantially insoluble in the solvent selected. Most of the $CO_2$ absorbed in the solvent can be released by simple flashing. The stream of $CO_2$ separated has a purity of more than 98.5 percent and may be used for organic synthesis. Optionally, the $CO_2$ stream may be introduced into the gas generator as at least a portion of the temperature moderator. The regenerated solvent is then recycled to the absorption column for reuse. When necessary final cleanup may be accomplished by passing the process gas through iron oxide, zinc oxide, or activated carbon to remove residual traces of $H_2S$ or organic sulfide.

$H_2S$ and COS-containing solvent may be regenerated by further flashing. The $H_2S$ and COS may be then converted into sulfur by a suitable process. For example, the Claus process may be used to produce elemental sulfur from $H_2S$, as described in Kirk-Othmer Encyclopedia of Chemical Technology, Second Edition Vol. 19, John Wiley, 1969 Page 352.

The substantially dry gaseous mixture from the gas purification zone has the following composition in mole percent; $H_2$ 45 to 75, CO 11 to 30, $CH_4$ 10 to 30, $CO_2$ nil to less than 1, A +$N_2$ nil to 0.5, and nil to less than about 0.1 parts per million of total sulfur i.e. $H_2S$+COS. Its gross heating value is in the range of about 400 to about 530 BTU/SCF. This gas stream may be at a temperature in the range of about 100 to 200°F. after the acid gas is removed. It is preheated to a temperature in the range of about 400° to 500°F. by preferably indirect heat exchange with the process gas stream from the first catalytic methanator.

The catalytic production of methane from hydrogen and carbon oxides is ordinarily highly exothermic. Excessive catalyst-bed temperatures that can destroy the activity of the catalyst and reduce methane yields may be controlled by any of the following techniques; distribution of the feed-gas stream througout fixed bed reactors by means of separate inlet points, embedding tubular coolers in the catalyst beds and producing steam which may be used elsewhere in the process, cooling the effluent gas between beds with simultaneous steam generation, use of beds of fluidized catalyst, or by using a free-flow tubular reactor whose inside surfaces are coated with catalyst.

Another method of controlling catalyst-bed temperatures while increasing the concentration of methane in the product gas consists of recycling a portion of the product gases through the catalyst bed in admixture with fresh feed gas at ratios ranging from 0.5 to 50 volumes of recycle gas per volume of fresh feed gas and preferably at recycle ratios in the range of 1 to 5.

The Group VIII transition elements, mainly iron, nickel, and cobalt, appear to be the most suitable for use as methanation catalysts. Typical commercial preparations contain about 33 to 78 weight percent of nickel oxide and about 12 to 25 weight percent of aluminum oxide and may be used in the form of ⅜ × ⅜inch or 174 × ¼inch cylindrical tablets. A typical nickel oxide catalyst is Girdler G65 produced by Chemetron Corp. Suitable catalyst compositions include the following: $NIO.Al_2O_3$ or $Nio.MgO$ precipitated on kaolin and reduced with hydrogen; and also in parts by weight Ni 100, ThO 6, MgO 12, and Kieselguhr (diatomaceous earth) 400 reduced with hydrogen for 12 hours at 742°F. followed by heating at 932°F. The life of the catalyst may be extended by maintaining the sulfur level in the reactant gases below about 0.005 grains of sulfur per thousand standard cubic feet.

It has been determined that by maintaining the interrelated process variables within certain critical ranges the CO and $H_2$ in the methane-rich process gas stream may be catalytically reacted to increase the methane content of the process gas stream without producing undesirable side-products such as soot. Thus, in contrast with prior art processes, in the subject process there is no accumulated deposition of free-carbon on the methanation catalyst, while simultaneously producing valuable high temperature superheated steam. Such carbon deposition would ordinarily decrease the efficiency of the process and shorten the life of the catalyst. The operating temperature in the first catalytic methanator is in the range of about 1420° to 1570°F., and preferably 1500° to 1550°F. Space velocities range from 100 to 10,000 standard volumes of gas per volume of catalyst ($hr^{+1}$) and pressures range from 25 to 250 atmospheres. Preferably, the pressure in the methanator is substantially the same as that in the gas generator less any relatively minor pressure drop in the line. The mole ratio $H_2$/CO of the feed gas is 2.6 and above and preferably in the range of 2.6 to 4.0. The methane content in the feed gas is in the range of 10 to 30 mole % (dry, $CO_2$ free-carbon).

The effluent gas leaving the first catalytic methanation reactor has a temperature in the range of about 1420° to 1570°F., and comprises from about 40 to 60 volume percent of methane (dry basis), $H_2$, CO, $H_2O$, $CO_2$ and minor amounts of $N_2$ and A. The gross heating value of the reacted gas stream leaving the first methanator is in the range of about 600 to 740 BTU/SCF (dry basis). The water in the process gas stream is condensed out and optionally any $CO_2$ may be removed in the manner described previously.

In order to remove the water from the process gas stream leaving the first methanator, the process gas stream is cooled to a temperature below the dew point. In doing this, it is economic to recover the sensible heat in the process gas stream. Thus, the hot effluent leaves the first methanator at a temperature in the range of about 1420° to 1570°F. and is cooled with water in a waste heat boiler to a temperature of about 500° to 600°F. By this means boiler feed water at a temperature of about 150° to 200°F. may be converted into superheated steam at a temperature in the range of about 650° to 750°F. The partially cooled process gas stream may be further cooled to a temperature in the range of about 200° to 300°F. by indirect heat exchange with the incoming gaseous feedstream to the methanator which is simultaneously preheated to a temperature in the range of about 400° to 500°F. as previously mentioned. Finally, the process gas stream is cooled below the dew point to a temperature in the range of about 100° to 200°F. by heat exchange with boiler feed water at a temperature in the range of about 70° to 80°F.

The methane content of the methane-rich process gas stream from the first methanation zone may be increased to about 65 to 85 mole % (dry basis) without the concomitant formation of particulate carbon by the following additional steps. The methane-rich process gas stream is preheated to a temperature in the range of about 400° to 500°F. and introduced into a second catalytic methanator similar to the previously described first catalytic methanator. The mole ratio $H_2/CO$ of the feed gas stream to the second methanator is 2.6 and above, and preferably in the range of 2.6 to 4.0 The methane content in the feed gas is in the range of about 40 to 60 mole % (dry basis). The reaction temperature in the second methanation zone is in the range of about 1060 to 1210 and the pressure is in the range of 25 to 250 atmospheres. Preferably, the pressure is the same as that in the first methanator less the normal pressure drop in the line. The space velocity range is substantially the same as that for the first methanator. The effluent gas stream leaving the second methanator has a gross heating value in the range of about 770 to 910 BTU/SCF.

In a manner similar to that described previously for the process gas stream leaving the first methanator, the process gas stream leaving the second methanator is passed through three heat exchangers in series. By this means the process gas stream is cooled below the dew point to condense out water, while its sensible heat is simultaneously recovered. Thus, the process gas stream at a temperature in the range of about 1060° to 1210°F. is passed through a waste heat boiler and cooled to a temperature of about 500° to 600°F. by converting boiler feed water at a temperature of about 150° to 200°F. to by-product superheated steam at a temperature in the range of about 600° to 700°F. In the next heat exchanger the process gas stream is cooled to a temperature of about 200° to 300°F. by preheating the feed gas to the second methanator to a temperature of about 400° to 500°F. as previously mentioned. In a third heat exchanger, the process gas stream is cooled to a temperature in the range of about 100° to 200°F. to condense out water by heat exchange with boiler-feed water which in turn is heated from a temperature of about 70° to 80°F. to about 150° to 200°F.

The methane content of the methane-rich process gas stream from the second methanation zone may be increased to about 90 to 98 mole % (dry basis) without the concomitant formation of particulate carbon by the following additional steps. The methane-rich process gas stream is preheated to a temperature in the range of about 400° to 500°F. and introduced into a third catalytic methanator similar to the previously described first catalytic methanator. The mole ratio $H_2/CO$ of the feed gas stream to the third methanator is 2.6 and above, and preferably in the range of 2.6 to 4.0. The methane content of the feed gas is in the range of about 65 to 85 mole % (dry basis). The reaction temperature in the third methanation zone is in the range of about 700° to 850°F. and a pressure is in the range of about 25 to 250 atmospheres. Preferably, the pressure is the same as that in the first methanator less the normal pressure drop in the line. The space velocity range is substantially the same as that for the first methanator. The effluent gas stream leaving the third methanator has a gross heating value in the range of about 920 to 980 BTU/SCF (dry basis).

In a manner similar to that described previously for the process gas stream leaving the second methanator, the process gas stream leaving the third methanator is passed through three heat exchangers in series. By this means the process gas stream is cooled below the dew point to condense out water, while simultaneously producing steam. Thus, the process gas stream is passed through a waste heat boiler and cooled from a temperature of about 700° to 850°F. to about 500° to 600°F. by converting boiler feed water at a temperature of about 150° to 200°F. to by-product superheated steam at a temperature in the range of about 550° to 650°F. In the next heat exchanger the process gas stream is cooled to a temperature of about 200° to 300°F. by preheating the methane-rich feed gas to the third methanator to a temperature in the range of about 400° to 500°F. as previously mentioned. In a third heat exchanger, the process gas stream is cooled to a temperature in the range of about 100° to 200°F. to condense out water by heat exchange with boiler-heat water which in turn is heated from a temperature of about 70° to 80°F. to about 150° to 200°F.

The gross heating value of the dry process gas stream may be increased to 1000 BTU/SCF by removing any remaining impurities e.g. $CO_2$, $N_2$ and A that may be present, leaving substantially pure methane (about 98 to 99 mole percent or greater). $CO_2$ may be removed in the manner described previously.

DESCRIPTION OF THE DRAWING AND EXAMPLE

A more complete understanding of the invention may be had by reference to the accompanying schematic drawing which shows the previously described process in detail. Quantities have been assigned to the various streams so that the following description may also serve as an example.

On an hourly basis, about 2410 pounds of hydrocarbonaceous feedstock in line 1 at a temperature of about 230°F. from holding tank 2 are mixed in line 3 with 8530 lbs. of superheated steam at a temperature of about 800°F. from line 4.

The mixture is passed into annulus 5 of annulus burner 6 mounted in the upper flanged inlet 7 of vertical free-flow noncatalytic partial oxidation synthesis gas generator 8 having a 22 cubic feet reaction chamber 9. The hydrocarbonaceous feed mixture in holding tank 2 is comprised of 1157 lbs. of fresh fuel oil feed from line 10 having a gross heating value of 18,600 BTU/lb and 17° API, and 1253 lbs. of an oil-soot slurry from line 11 comprising 96 lbs. of particulate carbon and 1157 lbs. of a high boiling scrubbing oil which enters the system from line 12. 2395 lbs. of substantially pure oxygen (99.5 mole % $O_2$) in line 20 at a temperature of 110°F. are passed through center passage 21 of burner 6.

Partial oxidation reaction takes place in the refractory lined reaction chamber 9 of gas generator 8 at an autogenous temperature of about 1710°F. and a pressure of 1500 psig. The residence time in the reaction zone is about 12 seconds.

92,009 SCFH of effluent synthesis gas leaves the gas generator by way of bottom outlet 22 and line 23 having the composition and gross heating value as shown in Table I. The temperature of the methane-rich process gas stream is cooled to about 600°F. waste heat boiler 24 by indirect heat exchange with boiler feed water entering by way of line 25 at about 150°F. and leaving through line 26 at about 800°F. superheated steam. At least a portion of this superheated steam is returned to the synthesis gas generator by way of line 4 as previously described. Substantially all of the soot in the process gas stream is removed by oil scrubbing in venturi scrubber 27 with scrubbing oil from line 28. The oil-soot mixture in line 29 is passed into column 30 where it is scrubbed with additional scrubbing oil from line 31. Oil-carbon slurry leaves via line 11 at the bottom of column 30. It has been preheated by the scrubbing process and is stored in holding tank 2 prior to being fed to the synthesis gas generator as a portion of the feed as previously described. The solids-free process gas stream leaves by way of line 35 at the top of the column 30 and is introduced into cooler 36. There by indirect heat exchange with incoming boiler feed water at room temperature from line 37, the temperature of the process gas stream is reduced below the dew point e.g. about 100°F. to condense out water and any remaining non-volatiles which leave by way of line 38.

The dry solids-free process gas stream in line 39 is introduced into a conventional acid gas removal zone 40 where $CO_2$ and $H_2S$ are removed via lines 41 and 42. The composition and gross heating value of the process gas stream leaving acid gas removal zone 40 by way of line 43 is shown in Table I.

The process gas stream in line 43 is preheated to a temperature of about 500°F. in heat exchanger 45 by indirect heat exchange with reacted gas leaving first catalytic methanator 46 and first partially cooled in waste heat boiler 47. The preheated methane-rich process gas stream is passed through line 48 and into fixed bed methanator 46 at a space velocity of 7000 vol/-vol/hr. The catalyst in methanator 46 comprises $Ni-O.Al_2O_3$ precipitated on Kaolin and reduced with hydrogen.

As previously indicated, the effluent gas stream leaving first methanator 46 by way of line 49 at a temperature of about 1520°F. is cooled in three stages to a temperature of about 100°F., that is to below the dew point to condense out water. First, the process gas stream in line 49 is pased through waste heat boiler 47 and cooled to about 500°F. by indirect heat exchange with water entering by way of line 50 and leaving as about 700°F. superheated steam in line 51. Second, the process gas stream in line 52 is cooled to a temperature of about 200°F. in heat exchanger 45 by preheating the feed gas stream to the first methanator 46. Third, the process gas stream in line 53 is introduced into cooler 54 and cooled to below the dew point by indirect heat exchange with boiler feed water which enters by way of line 55 at room temperature i.e. about 70°F. and which leaves by way of line 50 at 150°F. Water collects at the bottom of cooler 54 and is drained off periodically through line 56.

In the second methanation stage, the dry process gas stream leaving the first methanation zone in line 60 and having the composition and gross heating value shown in Table I is preheated in heater 61 to a temperature of about 500°F. and is introduced into second catalytic methanator 62 by way of line 63. The methanation catalyst in methanator 62 is the same as the catalyst in methanator 46. CO and $H_2$ react in methanator 62 to produce methane and water. The effluent gas stream leaves by way of line 64 at a temperature of about 1160°F. In the manner described previously with respect to the first methanation stage, heat is recovered from the process gas stream first in waste heat boiler 65 where superheated steam is produced at a temperature of about 650°F. and which leaves by way of line 66, second in heat exchanger 61 to preheat the gaseous feedstream to the second methanator 62, and third in heat exchanger 67 where boiler feed water at room temperature is raised to about 150°F. The process gas stream is cooled to about 100°F., that is below the dew point, and the water which condenses out is removed by way of line 68.

In the third methanator stage the dry process gas stream leaving the second methanation zone in line 69 and having the composition and gross heating value shown in Table I is preheated in heater 75 to a temperature of about 500°F. and is introduced into third catalytic methanator 76 by way of line 77. The methanation catalyst in methanator 76 is the same as the catalyst in methanators 46 and 62. Also, the space velocities in methanators 46, 62, and 76 are about the same. CO and $H_2$ react in methanator 76 to produce methane and water. The effluent gas stream leaves by way of line 78 at a temperature of about 800°F. In the manner described previously with respect to the first two methanation stages, heat is recovered from the process gas stream first in waste heat boiler 79 where superheated steam is produced at a temperature of about 600°F. and which leaves by way of line 80, second in heat exchanger 75 to preheat the gaseous feedstream to the third methanator 76, and third in heat exchanger 81 where boiler feed water at room temperature is raised to about 150°F. The prrocess gas stream is cooled to about 100°F., that is below the dew point, and the water which condenses out is removed by way of line 82.

The composition and gross heating value of the dry process gas stream leaving the third methanation zone in line 83 is shown in Table I. The dry effluent gas stream leaving heat exchanger 81 by way of line 83 is introduced into a conventional acid gas removal zone 84 as previously described, where any residual $CO_2$ is removed through line 85. 29.250 SCF of clean product gas is removed by way of line 86 and comprises about 99 mole % methane and has a gross heating value of 1005 BTU/SCF. The composition and gross heating value of the product gas in line 86 is shown in Table I.

TABLE I

| | COMPOSITION AND CROSS HEATING VALUE Line No. (Mole % dry basis) | | | | | |
|---|---|---|---|---|---|---|
| | 23 | 43 | 60 | 69 | 83 | 86 |
| CO | 13.3 | 19.5 | 9.5 | 2.0 | 0.1 | 0.1 |
| $H_2$ | 35.0 | 50.6 | 29.3 | 8.6 | 0.8 | 0.8 |
| $CH_4$ | 20.5 | 29.8 | 57.4 | 84.3 | 94.1 | 99.0 |
| $CO_2$ | 30.8 | nil | 3.7 | 5.0 | 4.9 | nil |
| $H_2S$+COS | 0.3 | nil | nil | nil | nil | nil |
| A+N | 0.1 | 0.1 | 0.1 | 0.1 | 0.1 | 0.1 |
| Gross heating Value BTU/SCF | 364 | 529 | 707 | 888 | 956 | 1005 |

Obviously many modifications and variations of the invention as hereinbefore set forth may be made without departing from the spirit and scope thereof, and only such limitations should be imposed as are indicated in the appended claims.

I claim:
1. A process for producing a methane-rich gas stream comprising the steps of
  1. reacting a hydrocarbonaceous fuel feed by partial oxidation with substantially pure oxygen and steam at an autogenous temperature in the range of about 1200° to 2200°F., and a pressure in the range of about 25 to 250 atmospheres gauge in the reaction zone of a free-flow unpacked noncatalytic synthesis gas generator, wherein the atomic ratio of oxygen in the free-oxygen containing gas to carbon in the hydrocarbonaceous fuel is in the range of about 0.6 to 1.2, the weight ratio of steam to hydrocarbo- naceous fuel is in the range of about 3 to 5, and the stream of effluent gas leaving said synthesis gas generator principally comprises $H_2$ and CO having a mole ratio (dry basis) $H_2/CO$ of 2.6 and above, $CH_4$ in the range of 10 to 30 mole % (dry, $CO_2$-free basis), $H_2O$, $CO_2$, particulate carbon, and acid gas containing of a gas from the group $CO_2$, $H_2S$, COS, and mixtures thereof;
2. cooling, and purifying the effluent gas stream from (1) in a gas cooling and purification zone thereby removing from the process gas stream substantially all of said particulate carbon, $H_2O$, and acid gas;
3. preheating the process gas stream from (2) having a mole ratio (dry basis) $H_2/CO$ of 2.6 and above to a temperature in the range of about 400° to 500°F., feeding the preheated gas stream into a first catalytic methanation zone and reacting the $H_2$ and CO in said process gas stream therein at a temperature in the range of about 1420° to 1570°F. and a pressure in the range of about 25 to 250 atmospheres without the concomitant formation of particulate carbon;
4. withdrawing a methane-rich gas stream from (3) containing about 40 to 60 mole % $CH_4$ (dry basis) and having a gross heating value of at least 600 BTU/SCF; and
5. cooling by three sequential heat exchange steps said methane-rich gas stream from (4) to below the dew point temperature to condense out and separate water comprising cooling first by indirect heat exchange with water to produce steam, second by preheating the process gas stream in (3), and third by indirect heat exchange with water.

2. The process of claim 1 further provided with the steps of passing water in indirect heat exchange with the effluent gas stream from step (1) thereby producing superheated steam at a temperature in the range of about 750° to 850°F. while effecting said cooling in step (2).

3. The process of claim 1 further provided with the steps of (a) preheating said methane-rich process gas stream from step (5) to a temperature in the range of about 400° to 500°F., (b) introducing said preheated process gas stream having a $H_2/CO$ mole ratio of 2.6 or more into a second catalytic methanating zone and reacting the $H_2$ and CO in said process gas stream therein at a temperature in the range of about 1060° to 1210°F. and a pressure in the range of about 25 to 250 atmospheres gauge without the concomitanat formation of particulate carbon; (c) withdrawing a methane-rich gas stream having a mole % $CH_4$ (dry basis) from about 65 to 83 and a gross heating value in the range of about 770 to 910 BTU per SCF (dry basis); and (d) cooling the methane-rich gas stream from (c) to a temperature below the dew point to condense out and separate water by three sequential heat exchange steps comprising cooling first by heat exchange with water to produce superheated steam at a temperature in the range of about 600° to 700°F., second by preheating the methane-rich process gas stream in (a), and third by indirect heat exchange with water.

4. The process of claim 3 further provided with the steps of (1) preheating the methane-rich process gas stream from step (d) to a temperature in the range of about 400° to 500°F., (2) introducing said preheated methane-rich process gas stream having a $H_2/CO$ mole ratio of 2.6 or more into a third catalytic methanating zone and reacting the $H_2$ and CO in said process gas stream therein at a temperature in the range of about 700° to 850°F., and a pressure in the range of about 25 to 250 atmospheres gauge without the concomitant formation of particulate carbon; (3) withdrawing a methane-rich gas stream having a mole % $CH_4$ (dry basis) from about 90 to 98 and a gross heating value in the range of about 920 to 980 BTU per SCF (dry basis); and (4) cooling the methane-rich gas stream fromm (3) to a temperature below the dew point to condense out and separate water by three sequential heat exchange steps comprising cooling first by heat exchange with water to produce superheated steam at a temperature in the range of about 550° to 650°F., second by preheating the methane-rich process gas stream in (1), and third by indirect heat exchange with water.

5. The process of claim 4 further provided with the step of removing any acid gas from the methane-rich stream from step (4) to produce a clean product gas stream containing about 98 to 99 mole % $CH_4$ or higher and having a gross heating value of 1000 BTU per SCF or more.

6. The process of claim 1 wherein the pressure in steps (2) to (5) are substantially the same as the pressure in the reaction zone of the synthesis gas generator in step (1) less ordinary minor pressure drops in the line.

7. The process of claim 1 wherein the catayst in the first catalytic methanation zone comprises 33 to 78 weight percent of nickel oxide and about 12 to 25 weight percent of aluminum oxide.

8. A process for producing a clean product gas comprising 98 to 99 mole % methane or more having a gross heating value of 1000 British Thermal Units per Standard Cubic Foot or more and by-product superheated steam comprising:
1. reacting a hydrocarbonaceous fuel feed by partial oxidation with substantially pure oxygen and steam at an autogenous temperature in the range of about 1200° to 2200°F. and a pressure in the range of about 25 to 250 atmospheres gauge in the reaction zone of a free-flow unpacked noncatalytic synthesis gas generator, wherein the atomic ratio of oxygen in the free-oxygen containing gas to carbon in the hydrocarbonaceous fuel is in the range of about 0.6 to 1.2, the weight ratio of steam to hydrocarbonaceous fuel is in the range of about 3 to 5, and the stream of effluent gas leaving said synthesis gas generator principally comprises $H_2$ and CO having a mole ratio (dry basis) $H_2/CO$ of 2.6 and above, $CH_4$ in the range of 10 to 30 mole % (dry, $CO_2$-free basis), $H_2O$, $CO_2$, particulate carbon and acid gas consisting of a gas from the group $CO_2$, $H_2S$, COS, and mixtures thereof;
2. cooling the effluent gas stream from (1) by indirect heat exchange with water thereby producing superheated steam at a temperature in the range of about 750° to 850°F.;
3. purifying the effluent gas stream from (2) in a gas purification zone thereby removing from the process gas stream substantially all of said particulate carbon, $H_2O$, and acid gas;
4. preheating the process gas stream from (3) having a mole ratio (dry basis) $H_2/CO$ of 2.6 and above to a temperature in the range of about 400° to 500°F., feeding the preheated gas stream into a first catalytic methanation zone and reacting the $H_2$ and CO in said process gas stream therein at a temperature in the range of about 1420° to 1570°F. and a pressure in the range of about 25 to 250 atmospheres without the concomitant formation of particulate carbon;

5. withdrawing a methane-rich gas stream from (4) containing about 40 to 60 mole % $CH_4$ (dry basis) and having a gross heating value of at least 600 BTU per SCF:

6. cooling by three sequential heat exchange steps said methane-rich gas stream from (5) to below the dew point temperature to condense out and separate water comprising cooling first by indirect heat exchange with water to produce steam, second by preheating the process gas stream in (4), and third by indirect heat exchange with water;

7. preheating said methane-rich process gas stream from step (6) to a temperature in the range of about 400° to 500°F.;

8. introducing said preheated process gas stream having a $H_2/CO$ mole ratio of 2.6 or more into a second catalytic methanating zone and reacting the $H_2$ and CO in said process gas stream therein at a temperature in the range of about 1060° to 1210°F. and a pressure in the range of about 25 to 250 atmospheres gauge without the concomitant formation of particulate carbon;

9. withdrawing a methane-rich gas stream having a mole % $CH_4$ (dry basis) from about 65 to 85 and a gross heating value in the range of about 770 to 910 BTU per SCF (dry basis);

10. cooling the methane-rich gas stream from (9) to a temperature below the dew point to condense out and separate water by three sequential heat exchange steps comprising cooling first by heat exchange with water to produce superheated steam at a temperature in the range of about 600° to 700°F., second by preheating the methane-rich process gas stream in (7), and third by indirect heat exchange with water;

11. preheating the methane-rich process gas stream from step (10) to a temperature in the range of about 400° to 500°F.;

12. introducing said preheated methane-rich process gas stream having a $H_2/CO$ mole ratio of 2.6 or more into a third catalytic methanating zone and reacting the $H_2$ and CO in said process gas stream therein at a temperature in the range of about 700 to 850°F. and a pressure in the range of about 25 to 250 atmospheres gauge without the concomitant formation of particulate carbon;

13. withdrawing a methane-rich gas stream having a mole % $CH_4$ (dry basis) from about 90 to 98 and a gross heating value in the range of about 920 to 980 BTU per SCF (dry basis);

14. cooling the methane-rich gas stream from (13) to a temperature below the dew point to condense out and separate water by three sequential heat exchange steps comprising cooling first by heat exchange with water to produce superheated steam at a temperature in the range of about 550° to 650°F., second by preheating the methane-rich process gas stream in (11), and third by indirect heat exchange with water; and 15. removing any acid gas from the methane-rich stream from step (14) to produce said clean product gas stream.

9. The process of claim 8 wherein the pressure in steps (2) to (15) are substantially the same as the pressure in the reaction zone of the synthesis gas generator in step (1) less ordinary minor pressure drops in the line.

10. The process of claim 8 wherein the catalyst in the catalytic methanation zones in steps (4), (8), and (12) comprises 33 to 78 weight percent of nickel oxide and 12 to 25 weight percent of aluminum oxide.

* * * * *

UNITED STATES PATENT AND TRADEMARK OFFICE
CERTIFICATE OF CORRECTION

PATENT NO. : 3,922,148
DATED : November 25, 1975
INVENTOR(S) : Edward T. Child

It is certified that error appears in the above-identified patent and that said Letters Patent are hereby corrected as shown below:

Column 5 line 64    Change "174" to -- 1/4 --

Column 5 line 67    Change "NIO.Al$_2$O$_3$" to -- NiO·Al$_2$O$_3$ --

Column 5 line 67    Change "Nio.MgO" to -- NiO·MgO --

Column 10 line 32   Change "29.250" to -- 29,250 --

Column 10 line 40   Change "CROSS" to -- GROSS --

Signed and Sealed this

Thirteenth Day of June 1978

[SEAL]

Attest:

RUTH C. MASON
Attesting Officer

DONALD W. BANNER
Commissioner of Patents and Trademarks